United States Patent [19]
Darras

[11] 3,903,980
[45] Sept. 9, 1975

[54] REMOVABLE ENGINE UNIT ARRANGEMENT FOR MOTORCYCLES

[75] Inventor: Jean Darras, Clamart, France

[73] Assignee: Societe Internationale de Vente pour l'Automobile et le Cycle, Courbevoie (Hauts-de-Seine), France

[22] Filed: Jan. 15, 1974

[21] Appl. No.: 433,477

[30] Foreign Application Priority Data
Feb. 21, 1973 France............................ 73.06164

[52] U.S. Cl. .................. 180/31; 280/287; 180/33 D
[51] Int. Cl............................................. B62k 11/12
[58] Field of Search........ 180/31, 33 A, 33 D, 33 R; 280/287; 74/551.9, 489, 488

[56] References Cited
UNITED STATES PATENTS

| | | | |
|---|---|---|---|
| 1,517,338 | 12/1924 | Bessiere............................ | 180/31 |
| 2,350,791 | 6/1944 | Mennesson........................... | 180/31 |
| 2,638,174 | 5/1953 | Mennesson........................... | 180/31 |
| 2,746,555 | 5/1956 | Dalrymple........................ | 180/31 X |
| 3,645,151 | 2/1972 | Yoshikawa........................... | 74/551.9 |

*Primary Examiner*—Kenneth H. Betts
*Attorney, Agent, or Firm*—Stevens, Davis, Miller & Mosher

[57] ABSTRACT

A bicycle has an engine unit provided with a driving roller adapted to be moved into frictional engagement with the tire of the front wheel. The engine is connected to the front fork by a readily releasable lock.

All engine controls are connected to a rotatable handgrip mechanism which can be locked either in the steering handlebars or to a tubular support on the engine. The engine may then be handled using the handgrip.

10 Claims, 6 Drawing Figures

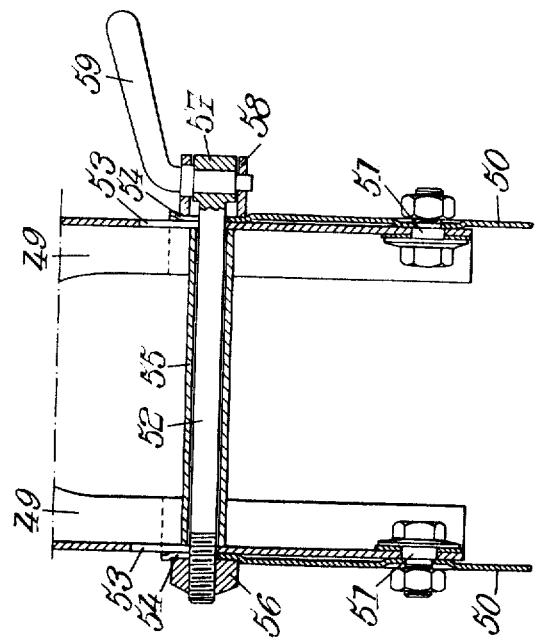
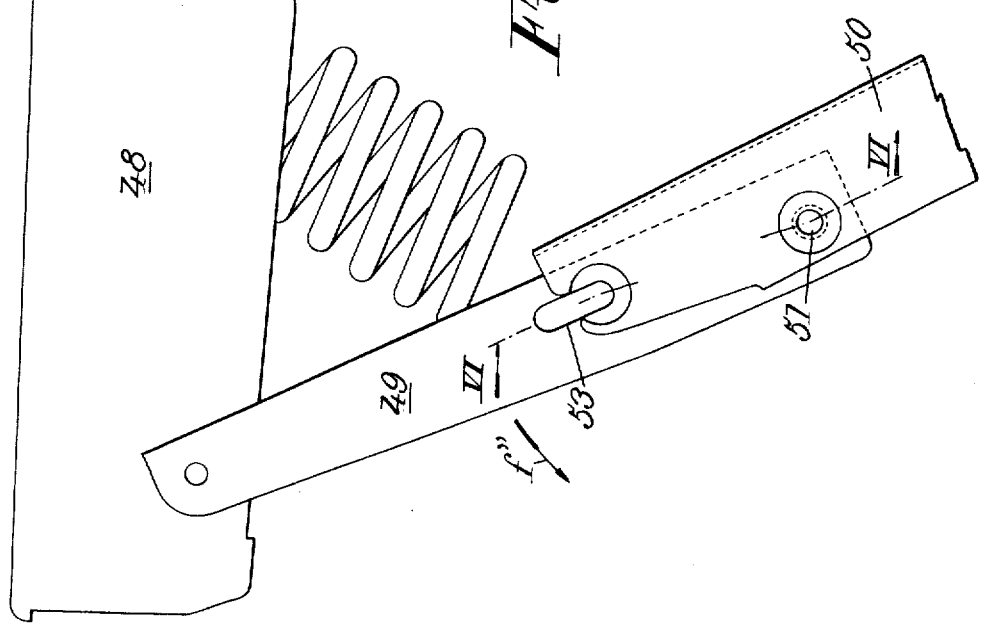

REMOVABLE ENGINE UNIT ARRANGEMENT FOR MOTORCYCLES

BACKGROUND OF THE INVENTION

The invention relates to motorcycles in which a wheel is driven directly by the engine, particularly bicycles provided with an engine which has a driving roller adapted to frictionally engage the tread of the front wheel to drive the same. There are many auxiliary engine cycles of this kind, particularly those marketted under the trade mark "VELOSOLEX".

Folding bicycles are known which comprise a frame in two parts interconnected by a joint such that one frame half can be folded on the other. Accordingly, each frame part usually comprises a bearing plate. The bearing plates are articulated to one another in their normal position by means of a quick-locking device. The handlebars are generally either slidable through a stem ring, after the release of a locking device, or reversible, to reduce the size of the cycle. However, it is by no means easy to transpose this approach to motorcycles. If the engine is left in position when the cycle is folded, when placed e.g. in the boot of a car, it will usually be in a position in which the petrol tank may empty. Also, the engine usually forms a bulky projection which makes it very difficult to receive the complete system, even when it is in its folded condition.

Also, removal of the engine from present-day and previously proposed motorcycles is a job involving long and dirty operations which are difficult to carry out elsewhere than in a workshop.

SUMMARY OF THE INVENTION

It is an object of the invention to provide a motorcycle in which the engine drives a wheel directly and which meets practical requirements better than previous cycles, inter alia because the above-mentioned shortcomings are at least partially overcome.

According to one aspect of the invention, there is provided a motorcycle in which a wheel is driven directly by an engine controlled by an element disposed on the cycle steering handlebars, means being provided to secure the engine to the cycle forks in a position in which the engine unit can drive the wheel, releasable means being provided for locking the engine unit in its secured position. Also, the engine control element is adapted for ready removal from the handlebars.

According to another aspect of the invention, the cycle engine unit is secured to the fork of the driven wheel by readily releasable means, and the engine control element (rotating grip mechanism for instance) has locking means adapted to co-operate either with the associated part of the handlebars or with a support borne by the engine unit.

The engine unit of a cycle as hereinbefore described is readily removable and it can be devised to be very stable when placed in a normal position, e.g. in a car. This is particularly the case of the engine unit used for the "SOLEX 5,000" motor scooter sold by the Assignee of the present invention, the engine having laterally a fuel tank on one side and a magnetic flywheel cover on the other. If a protective mudguard or mud flap or the like of appropriate length is provided on the engine unit, the same has a very wide base for standing on, comprising the tank, the cover and the mudguard or the like, so that there is very little risk of the engine being overturned accidentally.

To simplify removal, all the handlebar-mounted engine controls must of course be connected to the removable mechanism. As a rule, flexible sheathed transmissions connected neither to the cycle frame nor its forks are used. The engine exhaust pipe may be provided with a demountable joint, e.g. in the form of a ball and cone, between the part connected to the engine and the part connected to the fork. Preferably, the electrical connections between the engine and the cycle lighting circuit comprise a simple plug-in connector.

SHORT DESCRIPTION OF THE DRAWINGS

The invention will be better understood from the following description of an embodiment of the invention given by way of non-limitative example; the description refers to the accompanying drawings, wherein:

FIG. 5 is a partial lateral view of the saddle support elements for the cycle of FIG. 1, designed so that the saddle can be rotated forwards.

FIG. 6 is a section along line VI—VI of FIG. 5.

DESCRIPTION OF A PREFERRED EMBODIMENT

Figure 1:
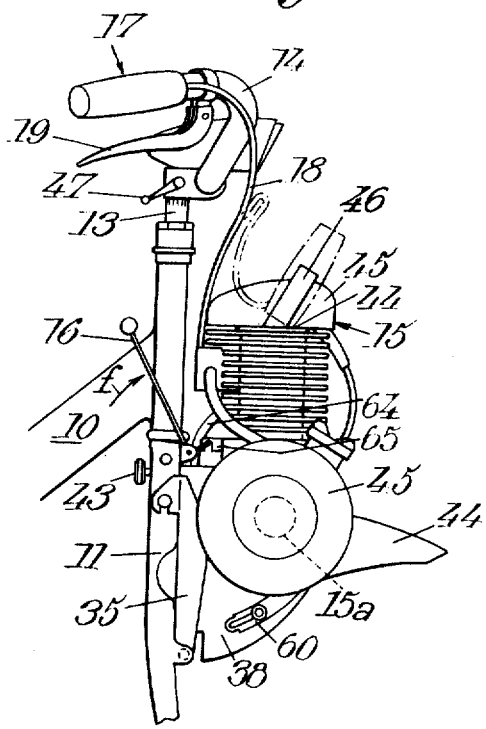
FIG. 1 is a very diagrammatic lateral view of the front fork, engine unit and handlebars of a cycle according to the invention.

Referring to FIG. 1, there is shown a fraction of the front part of the frame 10 of a motor scooter of the same general construction as the SOLEX 5,000 sold by the Assignee of the present invention. The common elements are of familiar construction and will not therefore be described. There is seen in FIG. 1 the top part of front forks 11 bearing a front wheel (not shown) and extended by a tube or stem 13 to which handlebars 14 are secured. An engine unit 15 is mounted on forks 11 by elements which will be described hereinafter and which enable the unit to be tilted from an operative position — in which a roller 15a (shown in chain lines in FIG. 1) bears on the front wheel tread — into a retracted position in which the roller is disengaged. The weight of the engine unit and return springs (not shown) tend to move the engine unit into its operative position when a lever 16 is moved into the position shown in FIG. 1 by being pivoted in the direction indicated by an arrow *f*.

The engine is controlled from the handlebars 14 by a removable rotating grip mechanism 17. For the sake of clarity, only the throttle control extending from the rotating grip, in the form of a flexible Bowden cable 18, is shown in FIG. 1. To facilitate engine removal the sheath is not secured to the frame or forks of the motorcycle. If there are other controls, such as a decompressor for the engine, they are also borne by the engine unit control device 15. Of course, the brake grip 19 on the same arm of the handlebars as grip assembly 17 is connected to the arm between the same and the handlebar stem so as not to impair demounting of the grip assembly 17.

Figure 2:
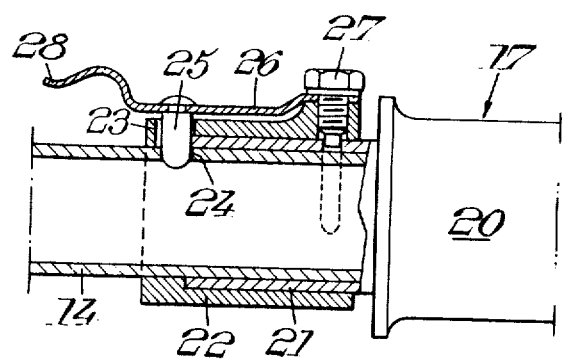
FIG. 2 is a simplified sectional view showing the rotating grip control mechanism located on the handlebars of the cycle of FIG. 1.

The grip assembly 17 is secured to the end part of the handlebars 14 by a releasable locking mechanism. As shown diagrammatically in FIG. 2, a rotating part 20 of the grip 17 is rigidly secured to a tubular portion 21. Beyond the part 20 the portion 21 rotates in a sleeve 22 formed with a radial aperture 23. The portion 21 has an internal diameter such that it slidably engages the end portion of the handlebars 14. The same is formed with a radial aperture 24 having the same diameter as that of a locking pin 25 borne by a resilient strip 26 which is secured to sleeve 22 by any appropriate means, such as a screw 27 projecting in an elongated aperture in portion 21. Strip 26 tends to keep pin 25 engaged in aperture 24 when the rotating grip device is in position and hence to prevent the rotating grip device from moving axially or turning on the handlebars. Strip 26 has a terminal projecting portion 28 by which it can be lifted manually to release the pin and thus free the grip assembly 17.

Figure 3:
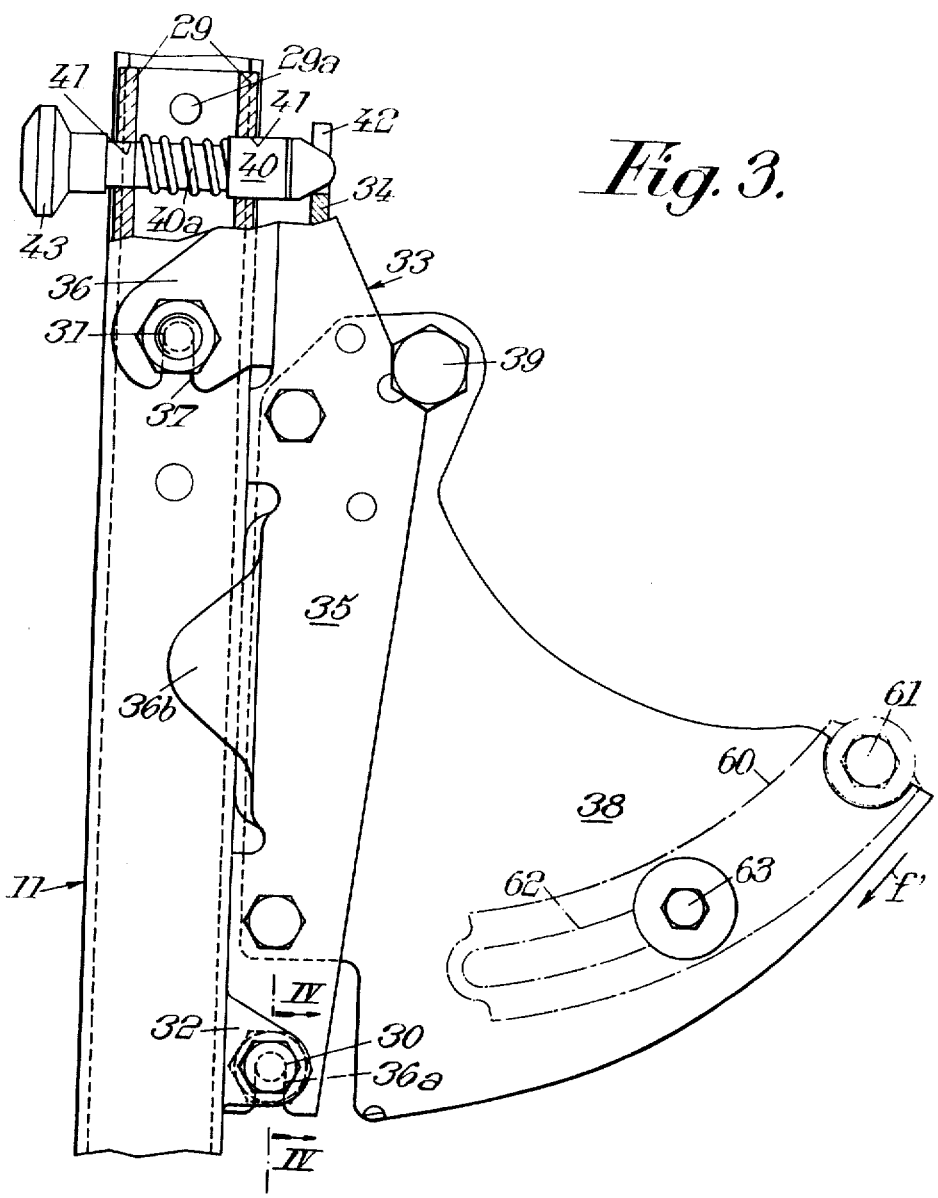
FIG. 3 is a lateral view, partially in cross-section and on an enlarged scale, showing the elements for securing the engine unit to the fork of the cycle of FIG. 1.
Figure 4:
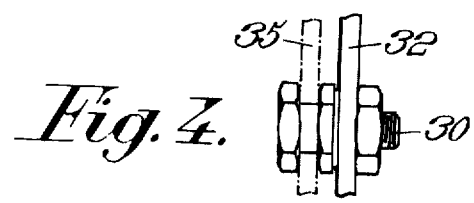
FIG. 4 is a diagrammatic detail view showing one of the securing pins or studs, in section along line IV—IV of FIG. 3.

The engine unit 15 is connected to the scooter front fork 11 by means which are shown in FIG. 3. Referring to FIG. 3, there is shown a portion of one of the arms of the fork 11, such arm consisting of a U member open inwardly. The two arms of the fork are rigidly connected to a fork crosspiece by bolts 31, only one of which is shown. The crosspiece comprises two U members each having two wings 29 welded to the stem 13 (FIG. 1) and a base plate 29a formed with two apertures adapted to receive the bolts 31 for securing the corresponding fork arm. Each fork arm carries two elements for securing the engine unit. In the embodiment of FIGS. 3 and 4, one of the elements is a screw 30 having locknuts and the other is that bolt 31 which is shown in FIG. 3. Screw 30 is secured to a lug 32 which is stamped with the fork arm so as to form a bearing member located inside of the fork. On the other hand, the threaded stem of bolt 31, with a locknut, forms a bearing outside the forks.

The engine support member comprises a caliper 33 comprising a baseplate 34 and two arms 35. Each arm has a bent lug 36b adapted to bear on the corresponding fork arm 11. Each arm is formed with a bottom recess 36a adapted to be engaged on screw 30 by downwards movement of stirrup 33 and to be locked on such screw. Also, each arm 35 has a lug 36 formed with a recess 37 adapted to be engaged on bolt 31 when the stirrup 33 is lowered for engagement with screw 30.

The engine unit is connected to caliper 33 through a cradle 38 comprising two substantially triangular members secured to the caliper; the cradle is pivotally connected to a rod 39, only the head of which can be seen in FIG. 3 and which extends through appropriate apertures in cradle 38. Since the articulation of the engine unit to the cradle 38 is conventional it need not be described herein detail; it will merely be noted that two arcuate strips 60, shown in chain-dotted lines in FIG. 3, are secured by screws 61 to the engine unit (not shown) and are formed with two arcuate apertures 62 through which bolts 63 secured to cradle 38 extend.

Springs (not shown) extending between cradle 38 and bolts 61 exert a force on the engine unit, in the direction indicated by an arrow $f'$, thereby biasing it towards the position in which the roller (not shown) of the engine unit frictionally engages the front wheel; if the engine unit is separated from the cycle, such springs pull the engine unit towards the abutment position in which it is shown in FIG. 3. If the lever 16 is pivoted manually in the opposite direction to that indicated by the arrow $f$, a rod 65 pivotally connected to the engine unit is pulled back and the engine unit rotates around rod 39 in the opposite direction to that indicated by the arrow $f'$. The lever 16 is so shaped that at the end of its travel, the weight of the engine unit and the return springs tend to prevent the lever 16 from returning to the initial position of the engine unit.

In addition to the elements for retaining the caliper 33, a resilient lock is provided to prevent accidental release of caliper 33. In the embodiment of FIG. 3, the locking device comprises an elongated member 40 slidable in apertures 41 in the arms 49 left of the handlebar stem. At rest, the terminal portion is resiliently retained in an aperture 42 in the caliper baseplate by a spring 40a. When the member 40 is engaged it prevents accidental upwards movement — and therefore accidental release — of caliper 33. The locking device can be released by pulling the knob-like end 43 of member 40.

The engine unit has a cylinder head plate 44 which is secured to the cylinder below a top cover 45 and which has an upwardly projecting tube 46 having the same inner diameter as the terminal portion of the handlebars 14. The tube 46 is adapted to receive the grip assembly 17 temporarily when the engine is to be removed. The tube 46 may be formed at an appropriate place with an aperture of the same size as the aperture 24 so that the grip device 17 can be locked to the engine unit and thus facilitate handling thereof. In normal operation the engine has two other connections to the frame 10 or front fork. One such connection is for the electric lighting supply wiring (not shown), which can just comprise an ordinary plug-in connector. The other connection is for the exhaust pipe, which must be connected to the silencer mounted on the fork. The exhaust pipe can consist of two parts, one secured to the forks, and the other part 64, to the engine, each such part having an element for connection to the other to provide a swivel-like joint which releases automatically when the engine unit is raised to remove it.

No description will be given of the means enabling the frame to be folded, since they are conventional. Similarly, some fairly conventional form of handlebar lock can be used; for instance, a handlebar having an eccentric quick-locking device controlled by a hand lever 47 can be used, the top part of the handlebar stem 13 being splined to provide adequate locking against rotation.

The saddle can be rendered tiltable forwards by using the facility shown in FIGS. 5 and 6. Referring to FIG. 5, the actual saddle 48 is borne by two uprights 49 articulated to section members 50, disposed in extension of the rear forks, by means of threaded bolts or the like 51 tightened by nuts with interposition or washers. The saddle is locked in its normal position by a rod 52 retained in elongated openings 53 in the uprights 49 and engageable in slots 54 in the members 50. A cross-tube 55 (FIG. 6) surrounds rod 52. A clamping nut 56 is secured to one terminal screwthreaded portion of rod 52. A ring 58 is slidably received on the other end 57 of rod 52. A control lever 59 rotates in end 57 and has an eccentric part which rotates in ring 58. The rod 52 can therefore be tightened and released just by pivoting the lever 59. Once released the rod 52 can be raised to disengage it from the slots 54 and to enable the saddle 48 to be tilted forwards in the direction indicated by arrow $f''$ in FIG. 5.

Since the dis-assembly and folding procedure is clear from the foregoing description, only a brief description will now be given.

First, the grip mechanism 17 is removed from the handlebars 14. To this end, the strip 28 is lifted and the grip is pulled, then engaged on tube 46 of the cylinder-head plate until the pin 25 locks. The electric wiring connector (which can be positioned near the handlebar stem) is opened. The engine-raising handle 16 is moved into the engine-bearing position, then disengaged from the rod 65 on the engine unit. There is no need to describe these two elements here since they are the same as on the "VELOSOLEX 5,000" motorcycle. The knob 43 of member 40 is pulled for unlocking it while the throttle grip is pressed downward with the other hand. While retaining the member 40, the engine is hand lifted using the rotating grip 17, whereby the slots 36a, 37 are lifted cleared from the bolts 30, 31. The engine can then be laid down on the mudguard or mudflap part 44 and on the cradle 38 in a position in which there is no risk of the tank emptying. The tank 45 and the flywheel cover which is symmetrical thereof (not seen in the drawings), restricts the amplitude of any accidental lateral tilting to a value such that the tank cannot empty.

The handlebars are then unlocked, taken off the stem, then reintroduced thereinto upside down and at a 90° offset from their original orientation. The saddle is unlocked, the rod 52 is raised to clear it from the slots 54, then the saddle is tilted forwards together with its support member.

All that then remains to be done, since the motorcycle is now on its stand (not shown), is to release the lever providing quick locking between the two parts of the frame and to pivot the front frame part on to the rear frame part.

Of course, the sequence of operations for re-assembly is exactly the converse of the sequence of operations just described.

In a modified embodiment, a simple grip can be used which can take place of the rotating grip mechanism on the handlebars so that there is then available a bicycle without an auxiliary engine.

I claim:

1. A bicycle having an engine unit provided with a roller for driving frictional engagement with the peripheral surface of a wheel of the bicycle, means for securing the engine to a fork carrying said wheel in a position such that the roller can be moved into engagement with said wheel, manually releasable means for locking the engine unit in its secured position on said fork, operator actuatable means for controlling the engine, and releasable means for securing said operator actuatable means to steering handlebars of said bicycle, said engine having means for receiving said operator actuable means, said releasable means being adapted to cooperate with both the handlebars to retain the operator actuable means in its operative position and with the receiving means to retain the operator actuable means in a position in which it can be used to handle the engine unit.

2. A cycle according to claim 1 wherein the operator actuatable means comprises a rotating grip device and said receiving means comprises a tube section.

3. A cycle according to claim 2 wherein said tube section is carried by a plate secured to the engine unit cylinder head.

4. A bicycle having an engine unit for direct frictional drive of a wheel, an operator actuatable rotating grip device for controlling said engine unit, means for retaining said rotating grip device on steering handlebars of the bicycle, and readily releasable means for locking the engine unit on a fork of said bicycle carrying said wheel, wherein said control grip device has connecting means constructed and arranged to co-operate either with the handlebars part adapted to receive such device or with a support mechanism disposed on the engine unit.

5. A cycle according to claim 4, wherein all engine controls, such as a carburettor throttle valve and decompressor, are connected to the rotating grip device by flexible transmissions.

6. A cycle according to claim 4, wherein the engine unit is borne by the front fork of said bicycle and has a roller bearing on the running surfaces of the front wheel for driving said front wheel.

7. A cycle according to claim 6, wherein the handlebars are secured to a steering tube by means so constructed that the handlebars can be secured both in their normal position or in an inverted position and at a 90° offset from the normal position.

8. A cycle according to claim 4, wherein the saddle is borne by uprights articulated to the rear forks of the cycle and adapted to be locked in a normal position by a rod extending through elongated apertures and slots, some of which are in the uprights and the others of which are in the rear forks, said rod being releasable from the slots so that the saddle can be tilted forwards when the cycle is being collapsed for storage and the engine unit removed.

9. A cycle according to claim 4, wherein the means for locking the engine unit to the fork comprise a caliper secured to the engine unit and formed with downwardly extending pairs of slots adapted to engage on cross-pins borne by the fork, a bolt extending through a cross-piece of the forks, and a return spring for urging said bolt to a position in which it engages in the caliper to prevent the engine unit from being lifted in the direction of disengagement from the slots.

10. A cycle according to claim 9, wherein the engine unit is rigidly secured to the caliper by a pin enabling it to rotate around an axis parallel to the axis of wheel rotation, the weight of the engine unit returning the engine unit into an angular position in which a drive roller of the engine is in engagement with the wheel; and a manual control element is provided so that the engine unit can be tilted in a direction tending to disengage the roller from the wheel and to lock it temporarily in such latter position.

* * * * *